(12) United States Patent
Enders et al.

(10) Patent No.: US 11,536,328 B2
(45) Date of Patent: *Dec. 27, 2022

(54) METHOD FOR ASCERTAINING A CLUTCH CHARACTERISTIC VARIABLE BY MEANS OF AN ELECTRIC MOTOR

(71) Applicant: Schaeffler Technologies AG & Co. KG, Herzogenaurach (DE)

(72) Inventors: Timo Enders, Bensheim (DE); Ralf Mannsperger, Renchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,574

(22) Filed: Jun. 13, 2022

(65) Prior Publication Data
US 2022/0307560 A1    Sep. 29, 2022

Related U.S. Application Data

(63) Continuation of application No. 17/284,005, filed as application No. PCT/DE2019/100907 on Oct. 17, 2019, now Pat. No. 11,396,916.

(30) Foreign Application Priority Data

Oct. 30, 2018 (DE) .......................... 102018127034.8
Nov. 19, 2018 (DE) .......................... 102018128959.6

(51) Int. Cl.
*F16D 48/06* (2006.01)

(52) U.S. Cl.
CPC ........... *F16D 48/064* (2013.01); *F16D 48/06* (2013.01); *F16D 2500/1045* (2013.01); *F16D 2500/1066* (2013.01); *F16D 2500/10412* (2013.01); *F16D 2500/30406* (2013.01); *F16D 2500/30421* (2013.01); *F16D 2500/30426* (2013.01);
(Continued)

(58) Field of Classification Search
None
See application file for complete search history.

(56) References Cited

U.S. PATENT DOCUMENTS 8,229,638 B2  7/2012  Biancale et al.
8,494,739 B2  7/2013  Falkenstein et al.
(Continued)

FOREIGN PATENT DOCUMENTS

CN    101270809 A    9/2008
CN    104903607 A    9/2015
(Continued)

*Primary Examiner* — Timothy Hannon

(57) ABSTRACT

A method ascertains a characteristic variable of a clutch installed into the powertrain of a vehicle for transmitting torque between a clutch input and a clutch output. A first electric motor is connected to the clutch input to introduce a first drive torque into the clutch. The torque is ascertained when the vehicle is at a standstill in that the clutch is first opened; the first electric motor is regulated at a first rotational speed; the clutch output is regulated at a second rotational speed; a counter torque which counteracts the transmission torque is applied to the clutch output; the clutch is then closed in order to assume a slipping state in which a specific differential rotational speed between the clutch input and the clutch output is present; the first drive torque is then ascertained; and the transmission torque is determined on the basis of the first drive torque.

19 Claims, 2 Drawing Sheets

(52) U.S. Cl.
CPC ............... *F16D 2500/3111* (2013.01); *F16D 2500/50236* (2013.01); *F16D 2500/7044* (2013.01); *F16D 2500/70434* (2013.01); *F16D 2500/70436* (2013.01); *F16D 2500/70442* (2013.01)

(56) References Cited

U.S. PATENT DOCUMENTS

| | | |
|---|---|---|
| 2006/0154781 A1 | 7/2006 | Petzold et al. |
| 2009/0011899 A1 | 1/2009 | Reuschel |
| 2016/0159343 A1 | 6/2016 | Hata et al. |
| 2018/0172090 A1 | 6/2018 | Kim |

FOREIGN PATENT DOCUMENTS

| | | |
|---|---|---|
| CN | 107401561 A | 11/2017 |
| DE | 4011850 A1 | 10/1990 |
| DE | 19915207 A1 | 10/2000 |
| DE | 102008027071 A1 | 1/2009 |
| DE | 102008011082 A1 | 8/2009 |
| DE | 102008001144 A1 | 10/2009 |
| DE | 102009022240 A1 | 2/2011 |
| DE | 102012204929 A1 | 10/2012 |
| DE | 102014210526 A1 | 12/2015 |
| DE | 102015218691 A1 | 4/2016 |
| DE | 102015216071 A1 | 3/2017 |
| DE | 102018107979 A1 | 8/2019 |
| EP | 1681496 A2 | 7/2006 |
| WO | 2016008463 A1 | 1/2016 |

METHOD FOR ASCERTAINING A CLUTCH CHARACTERISTIC VARIABLE BY MEANS OF AN ELECTRIC MOTOR

CROSS-REFERENCE TO RELATED APPLICATIONS

This application is a continuation application of U.S. patent application Ser. No. 17/284,005 filed Apr. 9, 2021, which is the U.S. National Phase of PCT Appln. No. PCT/DE2019/100907 filed Oct. 17, 2019, which claims priority to DE 102018128959.6 filed Nov. 19, 2018, which, in turn claims priority to DE 102018127034.8 filed Oct. 30, 2018, the entire disclosures of which are incorporated by reference herein.

TECHNICAL FIELD

The disclosure relates to a method for ascertaining a characteristic variable of a clutch installed into a powertrain of a vehicle.

BACKGROUND

For automatically actuated clutches, knowledge of the characteristic variables on which the actuation of the clutch depends is of crucial importance for achieving good driving comfort and for ensuring the operational safety of the clutch and the vehicle. The automated or partially automated actuation of the clutch is usually carried out by a clutch actuator in which an actuating unit is displaced along a travel path and thereby actuates the clutch. The transmitted transmission torque of the clutch depends on the position of the actuating unit and on the coefficient of friction of the friction lining(s) of the clutch. This relationship between the transmission torque and the travel path corresponds to a clutch characteristic line that is stored in a clutch control of the clutch.

These parameters can change during the operation of the vehicle, for example due to temperature fluctuations, wear, or fatigue processes in the components. For reliable operation of the clutch, however, knowledge of the characteristic variables is of great importance. While the travel path can be evaluated and readjusted via a sensor system, the coefficient of friction of the friction linings, and thus the transmission torque, is more difficult to ascertain.

In WO 2016/008463, a method for adapting a coefficient of friction of a hybrid disconnect clutch is proposed. The hybrid disconnect clutch connects an internal combustion engine to an electric motor. When the internal combustion engine is running, the clutch is first opened and then closed far enough for the clutch to be operated in a slipping manner. The output speed on the powertrain remains constant here. The adaptation of the coefficient of friction then takes place as a function of the position of the actuating unit from which the clutch is operated with slip.

SUMMARY

It is desirable to improve a method for ascertaining a characteristic variable of a clutch installed into a powertrain of a vehicle. In particular, this should be ascertained while the vehicle is at a standstill.

Accordingly, a method is proposed for ascertaining a clutch characteristic variable of a clutch installed into the powertrain of a vehicle for transmitting a transmission torque between a clutch input and a clutch output. A first electric motor is connected to the clutch input in order to introduce a first drive torque into the clutch. The transmission torque is ascertained when the vehicle is at a standstill in that the clutch is first opened, the first electric motor is regulated at a first rotational speed, the clutch input rotates at the first rotational speed, the clutch output is regulated at a second rotational speed, a counter torque which counteracts the transmission torque is applied to the clutch output, the clutch is then closed in order to assume a slipping state in which a specific differential rotational speed between the clutch input and the clutch output is present, said differential rotational speed being formed from the first and second rotational speed, the first drive torque is then ascertained, and the transmission torque is determined on the basis of the first drive torque.

As a result, the characteristic variable can be ascertained while the vehicle is at a standstill. Furthermore, the effect on the vehicle resulting from the implementation of the method can be so small that this method can be performed unnoticed from the outside. The method can be carried out more often and the characteristic variable can be ascertained at shorter time intervals. The reliability of the clutch can be increased and the operational safety and driving comfort of the vehicle can be improved.

The transmission torque can be ascertained to be equal to a difference between the first drive torque and a counteracting drive counter torque, for example a friction torque.

The powertrain can be a hybrid powertrain. The first electric motor can form a drive element which can deliver the first drive torque to vehicle wheels for the movement of the vehicle.

The counter torque is preferably greater than the transmission torque.

In a preferred embodiment of the invention, a second electric motor, which provides a second drive torque, is connected to the clutch output. The second electric motor can be connected to the clutch output in a rotationally fixed manner.

The second electric motor may be regulated to a second rotational speed. The second rotational speed can be less than the first rotational speed. In particular, the second rotational speed can be zero. The second electric motor can regulate the second rotational speed to zero. Additionally or alternatively, a brake can maintain the second rotational speed at zero. The brake can be, for example, a transmission brake or a wheel brake.

An internal combustion engine may be connected to the clutch input to effect a further drive torque. The internal combustion engine can be ineffective but freely rotating and have a drag torque, wherein the transmission torque can be ascertained as the difference between the first drive torque and the drag torque. The first drive torque is preferably greater than the drag torque.

The transmission torque can be smaller than the first drive torque.

The clutch may be a disconnect clutch, in particular a K0 clutch. The disconnect clutch can separate the internal combustion engine and an electric motor, here in particular the second electric motor, from one another or connect them to one another.

The drag torque may be ascertained when the clutch is still open by ascertaining the first drive torque of the first electric motor rotating at a third rotational speed before closing the clutch and ascertaining the drag torque as the first drive torque. The third rotational speed of the electric motor is kept constant or approximately constant. The third rotational speed can be the same as the first rotational speed.

The transmission torque and the rotational speed difference from the second and first rotational speed may be used to ascertain a coefficient of friction. The specific coefficient of friction can be used to adapt the clutch characteristic line.

The characteristic variable of the clutch stored in a clutch control of the clutch may be adapted as a function of the characteristic variable of the clutch ascertained. For example, the ascertained coefficient of friction can be stored or renewed in the clutch control.

BRIEF DESCRIPTION OF THE DRAWINGS

Further advantages and advantageous embodiments result from the description of the figures and the drawings.

The method is described in detail below with reference to the drawings. Specifically.

DETAILED DESCRIPTION

Figure 1:
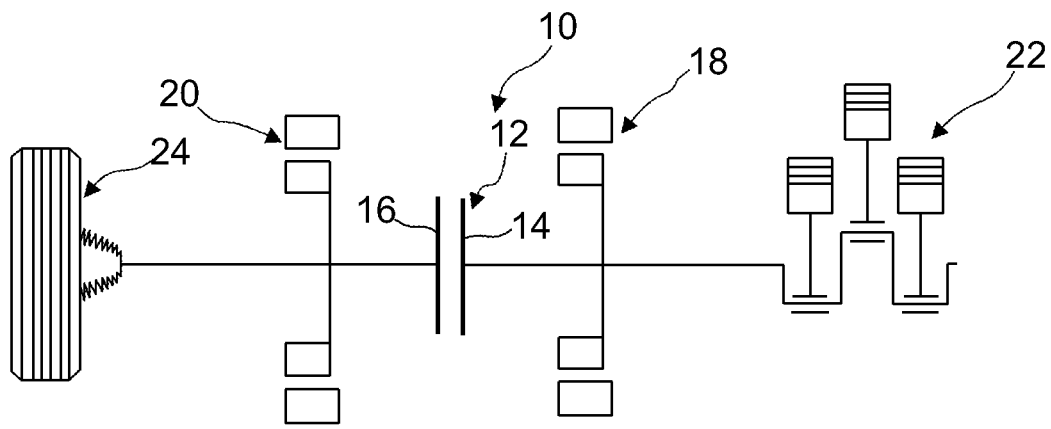
FIG. 1: shows a powertrain of a vehicle with a clutch, the characteristic variable of which is ascertained according to the method.

FIG. 1 shows a powertrain 10 of a vehicle with a clutch 12, the characteristic variable of which is ascertained according to a method. The clutch 12 is installed into the powertrain 10 and effects a transmission of a transmission torque between a clutch input 14 and a clutch output 16. The transmission torque is the torque transmitted via the clutch 12.

A first electric motor 18 is connected to the clutch input 14 in a rotationally fixed manner for introducing a first drive torque into the clutch 12. A second electric motor 20 can effect a second drive torque and is connected to the clutch output 16 in a rotationally fixed manner. The first electric motor 18 and the second electric motor 20 are connected in series when the clutch 12 is closed and can deliver their first and second drive torques to an output 24, for example to a vehicle wheel.

An internal combustion engine 22 is connected to the clutch input 14 in a rotationally fixed manner to effect a further drive torque. The internal combustion engine 22 is connected in series with the first electric motor 18. The clutch 12 is designed as a disconnect clutch, in particular as a K0 clutch, and can connect the internal combustion engine 22 and the first electric motor 18 to the second electric motor 20 and the output 24. The internal combustion engine 22 has a certain drag torque, among other things due to the friction of the pistons in the cylinders.

Figure 2:
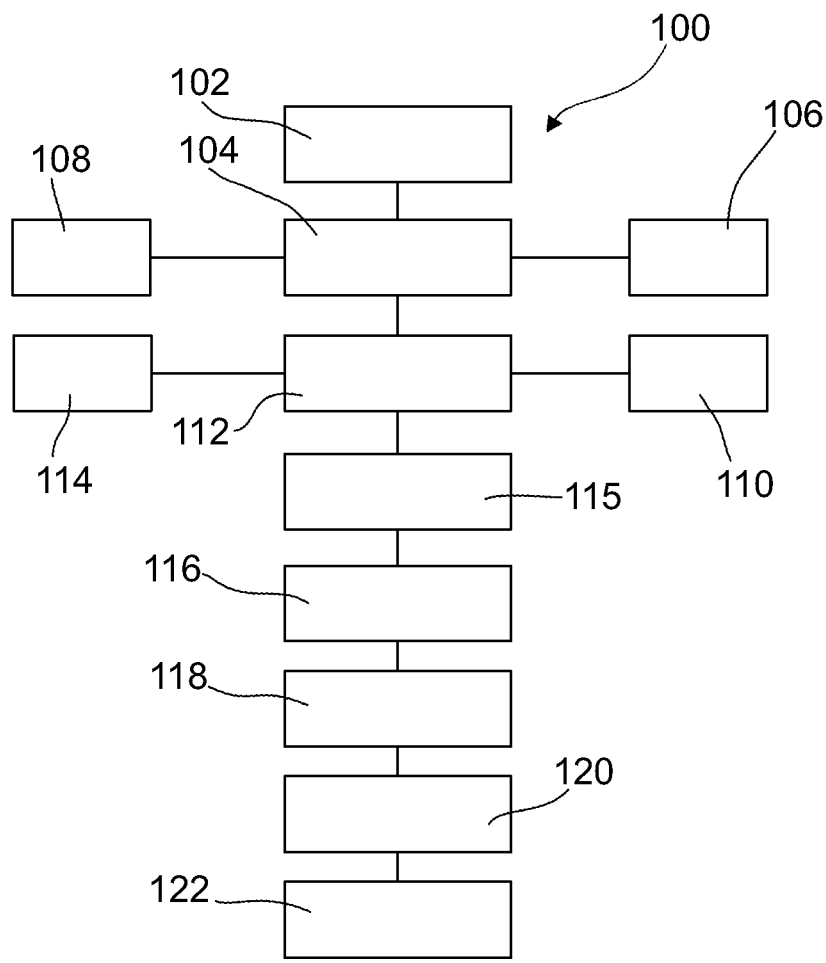
FIG. 2: shows a flowchart of the method.

FIG. 2 shows a flow chart of a method 100. The characteristic variable of the clutch to be ascertained for the clutch installed into the powertrain of the vehicle can be, for example, the transmission torque. The transmission torque is ascertained while the vehicle is at a standstill, in that the clutch is first opened 102, the first electric motor is then regulated 104 to a specified first rotational speed 106, for example 100 rpm, and the clutch input thus rotates 108 at the first rotational speed 106.

At the same time, before the regulation 104 of the first rotational speed 106 or afterwards, the clutch output is regulated 112 to a defined second rotational speed 110 so that the clutch output rotates 114 at the second rotational speed 110. Then a counter torque counteracting the transmission torque is applied 115 to the clutch output. The clutch is then closed 116 in order to assume a slipping state in which a predetermined rotational speed difference 118, formed from the first rotational speed 106 and the second rotational speed 110, is present between the clutch input and the clutch output. The first drive torque is then ascertained 120 and the transmission torque is ascertained 122 as a function of the first drive torque.

The internal combustion engine can be ineffective but freely rotating and have a drag torque, wherein the transmission torque is then ascertained as equal to a difference between the first drive torque and a counteracting drive torque, here the drag torque. The first drive torque is greater than the drag torque and the transmission torque.

As a result, the characteristic variable of the clutch can be ascertained while the vehicle is at a standstill and the effect on the vehicle resulting from performing the method 100, with the first electric motor operated almost silently, can be so small that this method 100 can be performed unnoticed from the outside. The method 100 can be carried out more often and the characteristic variable can be ascertained at shorter time intervals. The reliability of the clutch can be increased and the operational safety and driving comfort of the vehicle can be improved.

Figure 3:
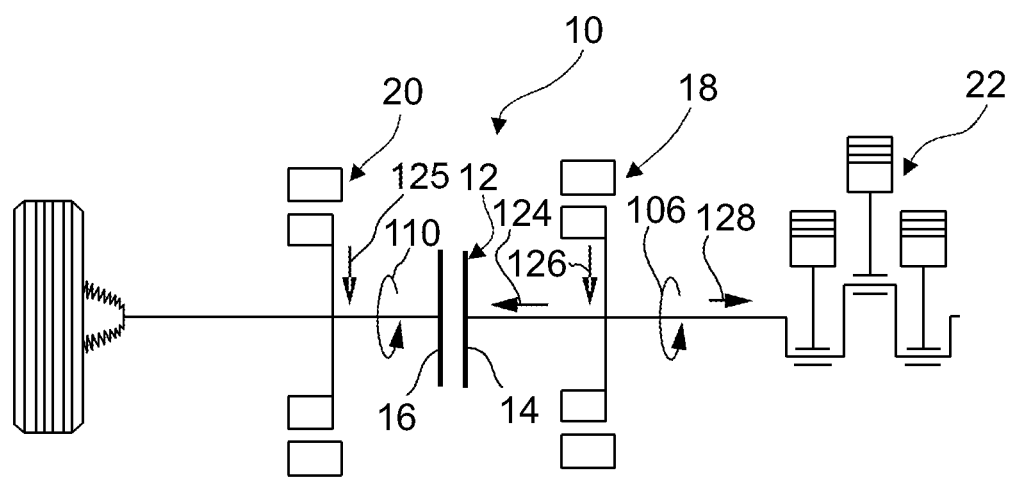
FIG. 3: shows a powertrain of a vehicle with a clutch, the characteristic variable of which is ascertained according to the method.

FIG. 3 shows a powertrain 10 of a vehicle with a clutch 12, the characteristic variable of which is ascertained according to a method. The first electric motor 18 is regulated to a first rotational speed 106. The second electric motor 20 connected to the clutch output 16 is regulated to a second rotational speed 110, which is zero. The second electric motor 20 can provide a counter torque 125 counteracting the transmission torque 124 at the clutch output 16. The counter torque 126 here is greater than the transmission torque 124.

As a result of the rotational speed regulation of the first electric motor 18, the transmission torque 124 is equal to the first drive torque 126 of the first electric motor 18 minus a counteracting drive counter torque, for example a drag torque 128 caused by the internal combustion engine 22. The first drive torque 126 is preferably greater than the drag torque 128 in order to enable a transmission torque 124.

The drag torque 128 can be ascertained with the clutch 12 still open by ascertaining the first drive torque 126 of the first electric motor 18 rotating at a third rotational speed, for example the first rotational speed 106, and ascertaining the drag torque 128 as the first drive torque 126 before the clutch 12 is closed.

LIST OF REFERENCE SYMBOLS

10 Powertrain
12 Clutch
14 Clutch input
16 Clutch output
18 Electric motor
20 Electric motor
22 Internal combustion engine
24 Output
100 Method
102 Open clutch
104 Rotational speed control
106 First rotational speed
108 Rotation at first rotational speed
110 Second rotational speed
112 Rotational speed control
114 Rotation at second rotational speed
115 Provision of counter torque
116 Close clutch 118 Rotational speed difference
120 Ascertain drive torque
122 Ascertain transmission torque
124 Transmission torque
125 Counter torque
126 Drive torque
128 Drag torque

What is claimed is:

1. A vehicle comprising:
an internal combustion engine having an output shaft;
a first electric motor driveably connected to the output shaft;
a second electric motor;
a clutch selectively coupling the output shaft to the second electric motor; and
a controller programmed to, while the vehicle is at a standstill:
regulate the first electric motor at a first rotational speed;
regulate the second electric motor at a second rotational speed;
close the clutch to assume a slipping state in which a specific differential rotational speed, formed from the first and second rotational speeds, is present between the clutch input and the clutch output; and
then, upon determining a first drive torque, determine a transmission torque based on the first drive torque.

2. The vehicle of claim 1, wherein the second rotational speed is lower than the first rotational speed.

3. The vehicle of claim 2, wherein the second rotational speed is equal to zero.

4. The vehicle of claim 1, wherein the internal combustion engine is not generating power during the standstill but has a drag torque, the controller being further programmed to determine the transmission torque based on a difference between the first drive torque and the drag torque.

5. The vehicle of claim 4, wherein the controller is further programmed to determine the drag torque when the clutch is still open by determining a first drive torque of the first electric motor rotating at a third rotational speed before closing the clutch and determining the drag torque as the first drive torque.

6. The vehicle of claim 1, wherein the controller is further programmed to determine a coefficient of friction based on the transmission torque and the rotational speed difference.

7. The vehicle of claim 1, wherein the clutch is a disconnect clutch.

8. A method, comprising, while a vehicle is at a standstill:
regulating a first electric motor at a first rotational speed, wherein the first electric motor is connected to a clutch input of a clutch;
regulating a second electric motor at a second rotational speed, wherein the second electric motor is connected to a clutch output of the clutch;
closing the clutch to assume a slipping state in which a specific differential rotational speed, formed from the first and second rotational speed, is present between the clutch input and the clutch output; and
then, upon determining a first drive torque, determining a transmission torque based on the first drive torque.

9. The method of claim 8, wherein the second rotational speed is lower than the first rotational speed.

10. The method of claim 9, wherein the second rotational speed is equal to zero.

11. The method of claim 8, wherein an internal combustion engine is connected to the clutch input to effect a further drive torque.

12. The method of claim 11, wherein the internal combustion engine is not generating power during the standstill but has a drag torque, wherein the transmission torque is determined based on a difference between the first drive torque and the drag torque.

13. The method of claim 12, wherein the drag torque is determined when the clutch is still open by determining a first drive torque of the first electric motor rotating at a third rotational speed before closing the clutch and determining the drag torque as the first drive torque.

14. The method of claim 8, further comprising determining a coefficient of friction based on the transmission torque and the rotational speed difference.

15. The method of claim 8, wherein the clutch is a disconnect clutch.

16. A method, comprising:
regulating a first electric motor at a first rotational speed, wherein the first electric motor is connected to a clutch input of a clutch;
regulating a second electric motor at a second rotational speed, wherein the second electric motor is connected to a clutch output of the clutch;
applying a counter torque with the second electric motor;
closing the clutch to assume a slipping state in which a specific differential rotational speed, formed from the first and second rotational speed, is present between the clutch input and the clutch output; and
determining a coefficient of friction based on the counter torque and the differential rotational speed.

17. The method of claim 16, wherein the second rotational speed is lower than the first rotational speed.

18. The method of claim 17, wherein the second rotational speed is equal to zero.

19. The method of claim 16, wherein the clutch is a disconnect clutch.

* * * * *